(12) United States Patent
Behera et al.

(10) Patent No.: US 12,169,450 B1
(45) Date of Patent: Dec. 17, 2024

(54) SYSTEM AND METHOD FOR SOFTWARE WORKFLOW TEST CREATION

(71) Applicant: Morgan Stanley Services Group Inc., New York, NY (US)

(72) Inventors: Anshuman Behera, Kearny, NJ (US); Mohammed Mazeed Ahamed, Andhra Pradesh (IN); Raka Rajanigandha, Jersey City, NJ (US); Sujit Eapen, Plainsboro, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/412,757

(22) Filed: Jan. 15, 2024

(51) Int. Cl.
*G06F 11/36* (2006.01)

(52) U.S. Cl.
CPC ...... *G06F 11/3684* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 9,170,821 B1 * | 10/2015 | Palaniappan | G06F 11/3688 |
| 11,334,471 B1 | 5/2022 | Stocker et al. | |
| 11,704,229 B1 | 7/2023 | Li et al. | |
| 2012/0254291 A1 * | 10/2012 | Feldman | G06Q 10/06 |
| | | | 709/203 |
| 2015/0095895 A1 * | 4/2015 | Taneja | G06F 11/3684 |
| | | | 717/132 |
| 2017/0314714 A1 | 11/2017 | Shyamsundar et al. | |
| 2019/0324893 A1 * | 10/2019 | Vaishnav | G06F 11/3664 |
| 2020/0225287 A1 * | 7/2020 | Krishnakumar | G06F 11/3006 |
| 2020/0319995 A1 * | 10/2020 | Mitra | G06F 16/958 |
| 2021/0173766 A1 * | 6/2021 | Deb | G06F 11/3692 |
| 2021/0326244 A1 | 10/2021 | Stocker et al. | |
| 2022/0037003 A1 * | 2/2022 | Oliveira | G06F 8/38 |
| 2022/0164279 A1 * | 5/2022 | Stocker | G06F 11/3664 |
| 2022/0207438 A1 * | 6/2022 | Johnston | G06F 11/3664 |

(Continued)

OTHER PUBLICATIONS

VMWare, "Developing Workflows with VMware vRealize Orchestrator 8.x", 2022, VMWare (Year: 2022).*

(Continued)

*Primary Examiner* — Hossain M Morshed
(74) *Attorney, Agent, or Firm* — PEARL COHEN ZEDEK LATZER BARATZ LLP

(57) ABSTRACT

A system and method may generate a test process a workflow operated by software by, using definitions of a workflow relating to software data processing and user interface (UI) elements, produce test case flows and UI element details, UI element details including UI actions and control types; map steps in test case flows to steps describing UI element details; and for each mapping produce a test script, Test case flows may include series of entries, each including a step, steps describing workflow sub-tasks and each step corresponding to UI actions. Each test script may include a series of UI actions, the UI actions including UI verify and input operations. UI actions may describe interactions with a UI element. UI actions may include validations (e.g. checking if the output or the result of a step matches what is expected, and producing a report) of a UI element.

20 Claims, 12 Drawing Sheets

(56) References Cited

U.S. PATENT DOCUMENTS

2022/0374334 A1* 11/2022 Brown ................ G06F 11/3688
2022/0398187 A1   12/2022 Balasubramanian et al.
2023/0004485 A1*  1/2023 Ranasinghe ........ G06F 11/3684
2023/0315615 A1* 10/2023 Zong .................. G06F 11/3684
                                                                717/125

OTHER PUBLICATIONS

Hammel, "Assuring Domain Software Quality through Workflow Testing and Specification", 2023, Ball State University, Muncie, IN (Year: 2023).*

IBM What is business process management?, downloaded from website https://www.ibm.com/topics/business-process-management on Jan. 12, 2024, 4 pages.

PEGA Workflow management, downloaded from website Workflow Management | End-to-End Workflow Management | Pega on Jan. 12, 2024, 2 pages.

* cited by examiner

| | | | | Have further actions |
|---|---|---|---|---|
| TC0037 | Approve -step2 - status: pending approval - audit:approved | *****-step7 - status: pending approval - audit:no value | Correct-step6 - status: pending approval- Audit.****** | |
| TC0038 | Submit -step1 - status: pending approval - audit:submitted | Reject -step2 - status: rejected- audit:rejected | Archiveprocess-step5 | |

Fig. 3

| Keyword (action) | Control type | Object name | Value | Elements | Object ID |
|---|---|---|---|---|---|
| Verify | Label | View transfers details | | | |
| Verify | Section | Transfers details | | | |
| Verify | Section | Region | | | |
| Settext | Textarea | Submitter comment | Test comments | | |
| NA | Html | Popup | | | |
| Popup Title :Confirmation/ on Action : approve/ Buttons : [No/Yes]/ Elements : {label-Are you sure you want to Approve the request?} | | | | | |
| Popup Title :Confirmation/ on Action : reject/ Buttons : [No/Yes]/ Elements: {label-Are you sure you want to Reject the request?} | | | | | |
| Verify | Button | Unclaim | | | |
| Verify | Button | Save | | | |

Fig. 4

| Keyword (action) | Control type | Object name | Value | Elements | Object ID |
|---|---|---|---|---|---|
| Workflow type : transfers | | | | | |
| Step: step1 - action: submit | | | | | |
| Verify | Label | View transfers details | | | |
| Verify | Section | Transfers details | | | |
| Click | Radio | Category | Category1 | [Category1/ category2/ category3] | |
| Settext | Textbox | Comments | [Test comments] | | |
| Datepicker | Date | Date | [Currentdate] | | |
| Click | Dropdown | Duration | [2 months] | 2 months/ 3 months/ 4 months/ 5 months/ 6 months/ 7 Months/ 8 months/ 9 months/ 10 months/ 11 months/12 months | |
| Settext | Textarea | Reason | Test comments | | |
| NA | Html | Popup | | | |

Fig. 7

Test Summary 2    1    0    1m24.71s    [ 50% Successful ]
Tests   Failures   Ignored   Duration

[ Failed tests ] [ Packages ] [ Classes ]

| Package | Tests | Failures | Ignored | Duration | Success rate |
|---|---|---|---|---|---|
| Designerutilities | 1 | 0 | 0 | 2.529s | 100% |
| Runner | 1 | 1 | 0 | 1m22.18s | 0% |

Fig. 9

SYSTEM AND METHOD FOR SOFTWARE WORKFLOW TEST CREATION

FIELD OF THE INVENTION

The present invention relates generally to software testing; for example for automated generation and use of systems for testing workflows for software.

BACKGROUND OF THE INVENTION

Workflows controlling software may be tested, and part of that testing may include workflow testing. In some workflow systems, a workflow defines user interactions with software (e.g. software managing user accounts). That workflow may be developed and changed using a workflow designer tool, and the workflow may be used by users to perform actions by applying the workflow using a workflow dashboard. The workflow dashboard may display output to users and accept input from users using UI elements, and may perform data operations, for example, using API tools, such as REST API tools.

Workflow testing may include the testing of the workflow. The workflow may be for example the repeated set of inputs (typically from a human) to software and outputs (e.g. via a graphical user interface ("GUI")) from software; a workflow may also be a data representation of such a sequence of inputs and outputs. A workflow may be the series of user-facing operating operations software such as a workflow dashboard carries out, including the output to and input from a user, and also the data representation of this series. For example, a workflow may be made up of the series of operations to add an account to a system, to change a customer's information in a system, seek approval from a department, or other functionality.

A workflow controlling a software may undergo frequent changes in terms of addition of new workflows, updates to existing workflows and enhancements to the workflow applications. A workflow if built inaccurately, can have complex functional errors, data inaccuracies, user experience issues, and integration problems. Testing complex workflows can take several days, also detecting such issues and retesting the fixes can be time consuming. Testing and certification manually is time consuming, and creating a computer-implement testing and certification system manually is also time consuming. In order to make workflows available to an entity using or implementing the workflow software in a timely manner, there is a need to shorten the overall testing and certification process.

Existing software testing programs perform test designing (e.g., ARD, the Agile Requirement Designer) or test execution (such as QTP, the Quick Test Professional tool), but do not automate designing, building and execution of test cases, all in a single process. Current test orchestration tools may require many instructions as pre-requisites to create the test scenarios and run the tests, and no test tools are available to conduct automated testing of workflow applications. Current test tools are limited in their scope, for example focusing only on one of test design or test scripting or test execution. Existing test tools typically require manual intervention or configuration before they can be effectively used.

SUMMARY OF THE INVENTION

A system and method may generate a test (e.g. a test script or process) to test a workflow representing a series of operations (e.g. inputs to, outputs from) software. A workflow may be created, and this workflow itself may be tested, for example by a script in combination with a Selenium or other process. In some embodiments, the end-user software such as a workflow dashboard, which, in real world use cases carries out this workflow, is not itself tested: rather the workflow representation itself is operated on, where the workflow representation is a representation of the workflow that the workflow dashboard carries out during normal use.

A system may test a workflow operated by software (such as workflow dashboard software which conducts or follows a workflow), effectively testing the software itself. A system or method may input a definition of a workflow relating to data processing in a software program, and a definition of user interface (UI) elements for the workflow, the UI elements controlling or used for data input to and output from the software program; produce from the definition of the workflow a plurality of test case flows; produce from the definition of UI elements UI element detail descriptions, each UI element detail description comprising UI actions and UI control types; map steps in test case flows to steps describing UI element detail descriptions; and for each mapping produce a test script to operate the workflow. The workflow may relate to software such as a workflow dashboard, may describe operations causing data processing in a software program, and may use UI elements to perform software data processing. For example, a user dashboard may allow a user to interact with the workflow to cause underlying software (e.g., database software) to process data relating to the workflow, such as adding or altering customer accounts. Each test case flow may include a series of entries, each entry including a step, each step describing a sub-task within the workflow and each step corresponding to one or more UI actions. Each test script may include a series of UI actions, the UI actions including UI verify operations and UI input operations (e.g. a workflow or software receiving user click input to a button; workflow or software receiving user provided text to a text entry UI element, etc.). Each UI action may describe an interaction with a UI element. A UI action may include a validation (e.g. checking if the output matches expected output, checking if the result of a step matches an expected result, and producing a report) of a UI element.

Embodiments of the present invention may provide a self-directed workflow automation test tool ("SWAT") which may automate designing, scripting and executing testing conditions, e.g. all possible test conditions, in one process, in some cases without human intervention for a workflow application or workflow designer tool such as the IBM BPM (business process management) tools, and Pega workflow management tools. Embodiments may test and validate workflows executed by workflow dashboards; thus embodiments may improve software such as workflow dashboards.

Embodiments may improve testing and tested software by, for example, significantly reducing the effort dedicated to testing, e.g. by 80% over prior methods. Embodiments may improve software and software testing by automating testing, and automating manual design of all possible workflow scenarios, developing testing scripts, and executing scripts. Embodiments may provide for complete hands-free test design, test scripting and test execution; standardized test cases creation across all workflows; automating the automation process; 100% effort saving in the testing phase; ease of use; flexibility of test execution; and decoupling of design from execution. Embodiments may provide a complete automated test solution (from test designing through test planning, test scripting and test execution) of all possible workflows with no manual intervention.

In an Agile testing system, as one example, the need to shorten testing timelines without compromising the quality of the test system is a challenge. Workflow software applications, when enhanced or updated, can introduce complex issues such as data inconsistencies, state management issues, incorrect user privileges or controls, workflow variations, concurrent processes, system failures, etc. An embodiment of the invention may improve software and software testing by helping to detect these issues well ahead of implementation, in turn helping with early risk mitigation and cost avoidance.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

FIG. 3 depicts two example test case flows, each test case flow represented as a row in a table (e.g. an Excel table), the flows being produced from an input workflow, according to embodiments of the present invention.

FIG. 4 depicts an example portion of a UI element detail description, e.g. a step or screen represented in a file or table, according to one embodiment.

FIG. 7 depicts a portion of an end-to-end (E2E) test case which may act as a source for a test process, according to one embodiment.

FIG. 9 depicts a report, according to one embodiment.

Figure 1:
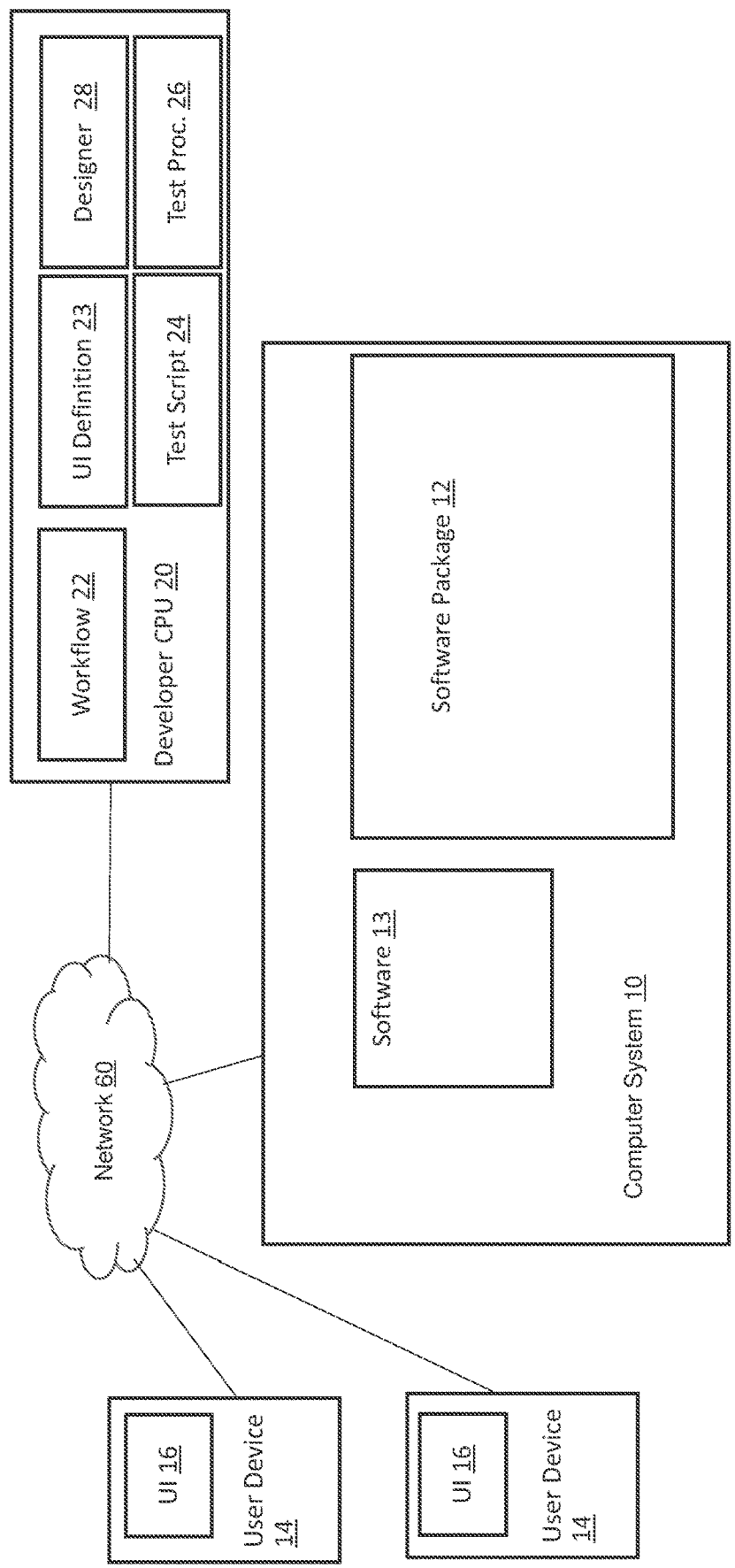
FIG. 1 depicts a system for generating test processes and testing software according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may generate or produce a test procedure or script to validate, test and certify a workflow operated by software such as a workflow dashboard, allowing the workflow to be fixed or improved if faults are found. In some embodiments, a workflow may be created, changed or edited by a workflow designer tool, and end users may perform tasks using the workflow and software such as a workflow dashboard. For example, a user computer may execute a workflow dashboard, which may display to the user a number of different workflows, e.g. in a task list, the workflows executing software and interfacing with databases to perform tasks such as adding a user account, requesting approval for an action such as adding or deleting a user, altering an arrangement with a customer and requesting or granting approval for such a change, etc. A user may select from a number of workflows on their dashboard to execute the workflows, and may have new workflows appear. For example, if a supervisor user is requested to give permission, a workflow relating to that may appear on the supervisor's dashboard. Workflows presented to multiple users may be claimed by a claim action such that the claiming user works on (e.g. provides input to) the workflow; a workflow that has been claimed may be unclaimed by a user.

Creating workflow validation scripts or instructions is a complex task. Embodiments may input definitions of a workflow (e.g. workflow 22 which may be executed by a workflow dashboard such as software package 12 in FIG. 1), which may be provided in, e.g. JSON (JavaScript Object Notation) or another format, and which may define for example, rules related to, e.g. routing of a workflow to target states and actions involved in a routing process, UI elements, user actions on the UI elements, and other information; and UI element definitions. An embodiment may produce from this input possible user paths or journeys of the workflow. Such user paths may include steps (e.g. sub-sets of workflows, such as enter customer information), and associate the steps with UI elements and actions. From this, an automated scripting procedure or test script may be created, which when executed executes and tests the workflow of the software. An embodiment may create test planning documentation, which may be embodied as part of table or Excel outputs, e.g. as seen in the example of FIG. 7. An embodiment may, after a script is used to tests a workflow, produce a report (such as the example report of FIG. 9) detailing, e.g., how many test cases have passed and how many have failed.

A workflow may be a series of user interactions with computer software, e.g. to achieve a goal using the software such as adding a user to a database. A workflow may include a series of steps, each step describing a sub-task within the workflow and each step corresponding to one or more UI actions, validations, verifications, inputs, etc. For example, a workflow to add a user may include collecting necessary information about a user and initiating a process to seek approval to add the user to a system in the case the information collected is sufficient; or reject and re-initiate if the information is not sufficient. A step may include multiple actions, each action being for example an interaction between a person and a computer software system, such as a UI input operation (e.g., clicking on a UI button) and UI verify operations (e.g., verifying or validating that a UI output is a certain output).

A process may input a workflow or a definition of a workflow, e.g. in JSON or other form, and output a number of a test case flows or contextual flows, each test case flow describing a series of steps which could occur in the input workflow depending on the user input and software output of the workflow. A test case flow may be a specific instance, dependent on user (or test process) input and UI or software output, which is a path among many possible paths in a workflow. For example, for a given workflow, a first test case flow may reflect that, with a particular set of data, a user (or a test process) has input all information correctly and an approval was given; and a second test case flow may reflect that a user has input certain information incorrectly and the user was requested to correct certain information, and after the user did so an approval was given. Thus the test case or contextual flows produced for a workflow can reflect all different realistic combinations or permutations of events, or paths, that take place depending on different user inputs and software program reactions. Impossible paths may be eliminated.

In one embodiment, each test case flow is represented by a row in a workflow table or spreadsheet (e.g. an .xls spreadsheet such as a process config Excel file), with each column, cell or entry in the row being a step. However, other representations of test case flows may be used. An embodiment may dynamically analyze inputs describing a workflow, such as a Process Config JSON file, for example using a Jackson library, and intelligently generate possible E2E test case flows based on the contextual relationships between different steps. A final user action may be placed at each step, e.g. SUBMIT a workflow; APPROVE a workflow or REJECT a workflow (other final user actions may be used). An embodiment may create a test script, e.g. represented as a feature Excel file, or another data structure, by adding the extracted details from, e.g. file describing a workflow table or spreadsheet and a file describing UI elements. An embodiment may improve prior art systems and have adaptability in response to changes in the input workflows (e.g. a config JSON file), ensuring that the new flow is automatically incorporated without manual intervention, e.g. the input and processing of a workflow may be triggered without human intervention by a change in a workflow. For example, a process such as a SWAT engine may read process config JSON files automatically and if a change is detected trigger a process of test script generation. An embodiment may improve technology by creating varied scenarios, for example by identifying alternative paths and potential variations in the workflow, exploring diverse user journeys within the workflow, enhancing test coverage without explicit specification allowing for more comprehensive testing strategy. An algorithm may identify the user's final actions to be taken at each step, resulting in test cases that mimic the actual user interactions and cover a wide range of scenarios.

An embodiment may input a workflow and output contextual flows or test case flows (e.g. as shown in FIG. 3) by dynamically analyzing inputs describing a workflow such as a process config JSON file using, e.g. a Jackson library, intelligently generating possible E2E test case flows based on the contextual relationships between different steps, with a final user action at each step, and create an output such as a Process Config Excel by adding the extracted details. An embodiment may ensure adaptability to changes in the config JSON, helping to ensure that the new flow is automatically incorporated without any manual intervention. An embodiment may create caried scenarios in the output, e.g. by identifying alternative paths and potential variations, exploring diverse user journeys within the workflow, and may enhance test coverage without explicit specification allowing for more comprehensive testing strategy. An embodiment may conduct a smart combination of steps by for example using an algorithm to identify the user's final actions to be taken at each step, resulting in test cases that mimic the actual user interactions and cover a wide range of scenarios.

In one embodiment, each step corresponds to one screen of UI elements, and each step is described by a separate file (e.g., an .xls file), where the file name is or includes the step as referenced in a cell describing that step. Each step may include multiple actions, and in one embodiment each step in a workflow cell includes a step name which refers to a step file or other data item (e.g. an xls spreadsheet) which describes that step in terms of its actions. Each step file may describe how the various UI elements for that step are expected to act. The step files and workflow test case flows may be combined to produce a script (which may be saved in a file such as an .xls spreadsheet, e.g. a feature .xls) which is used to take control of user software to test the workflow of the software. A feature Excel file may serve as adaptive and comprehensive test documentation, as it may be human-readable, and not only capture the E2E test cases but also provide details about each UI page, creating documentation and a unified resource repository for the testers. Dynamically generated feature Excel files may serve as an interactive and content-aware reference during the execution of custom developed Selenium methods. The feature Excel may also be converted to a script to operate an automated testing process. Such a script may be a Java based program which manipulates, e.g. a web browser, and may work with Selenium processes or other processes to interact with software to be tested. The output—feature Excel files and scripts—may be dynamically created, and thus may embrace changes in requirements, UI structures and E2E flows, offering a robust and improved solution, e.g. a "one-stop shop" for dynamic and evolving workflows. While certain data structures, tools and languages are discussed herein, e.g. .xls files, Java, Selenium and JSON, other such structures, tools and languages may be used.

Embodiments may improve workflow testing technology, and software being tested, by providing at runtime an integration of workflow steps with UI dynamics. Embodiments may provide dynamic generation of test scripts (e.g.

in the form of a features Excel document) and may provide runtime creation of test cases by combining a workflow journey from initiation to completion, capturing E2E test steps, and providing automated script generation. Embodiments may determine the definitive actions required to be taken on each UI element of each screen (e.g., Initiation Screen, Approval Screen, Completion Screen, etc.) and the type of actions to be taken (such as clicking a radio button, selecting a value from a dropdown, making a section visible on the screen based on a selection, or tab out after filing information in an input box, etc.), in an automated manner. Output such as features may be automatically converted into executable scripts to control and test workflow software. Such orchestration may ensure that a human tester's interaction with a test tool or the application under test is eliminated from initiation to completion during the testing phase; the process may be automated. Embodiments may optimize the testing process by avoiding the conventional quality assurance (QA) steps of determining the E2E test cases, creating feature files and defining the required methods for execution: these steps are typically an integral part of any test automation framework. Embodiments may eliminate human intervention to execute these steps.

FIG. 1 depicts a system for generating test processes and testing software according to embodiments of the present invention. A computer system 10 may execute one or more software packages 12, which may include workflow dashboard software. Workflow software such as software 12 may interact with, control, coordinate data processing in, and cause changes to data in, other software 13, e.g., database software and other software. During normal, e.g. non-test, operation, users may interact with computer system 10 and software packages 12 (e.g. to execute workflows) via user devices 14. User devices 14 may interact with, display data to, and receive input from, a user, via user interfaces 16, e.g. GUIs, using UI elements in combination with other input-output devices such as described in FIG. 10. User interfaces 16 may display data and receive input via UI elements, and allow a real user, and a test script, to provide such input and to view UI output or labels, and to perform steps and actions, A combination of computer system 10 executing software packages 12, and user devices 14, may execute workflows (e.g. one or more users in one or more locations operating software according to a workflow); and these systems may be tested by test scripts. While one computer system 10 and software package 12, and two user devices 14 are shown, other numbers of such components may be used in conjunction with embodiments of the present invention. For example, a software package 12 may be executed via multiple components across multiple locations (e.g., including by user devices 14), and/or in a remote or cloud environment.

A developer computer 20 may analyze workflow(s) 22 and UI definitions 23 for software package(s) 12, use workflow designer tool 28 to create or modify workflows 22, create test scripts or programs 24, and may use test process 26 to execute test scripts or programs 24. Test process 26 may be included in developer computer 20, or may be located elsewhere (e.g. in a cloud system), may be or use a process such as a Selenium process, and may include one or more processes, executed on different computing systems. Developer computer 20 executing test scripts or programs 24 may test the workflow(s) 22 which may normally be executed by software package(s) 12 (e.g. workflow dashboards). One or more network(s) 60, such as an intranet, the internet, a combination of networks, etc., may connect the various components, allowing the components to communicate.

Inputs to a process for test designing, test scripting and test execution may include existing application configurations, for example in the form of JSON formatted data. JSON files that represent software or workflow process steps (e.g. a workflow JSON input) and their user interface (UI) components (e.g. a UI JSON input), may be inputs to a process such as a SWAT engine to trigger the automated process of test designing, test scripting and test execution. An output feature .xls may be converted to Java instructions to use Selenium processes to control various computers and software packages to test the software. Examples of systems or software producing workflows subject to E2W testing by embodiments of the invention include, e.g. workflow tools such as, IBM BPM systems, and Pega workflow systems, but other systems may be used with embodiments of the present invention.

Converting or translating an output feature .xls file to Java or other instructions may include, using code (e.g. Java code), reading attributes from a feature.xls output, such as:
the Control type(Action),
the Object Name,
the Value of Input,
the relevant Web Elements and
their respective Object IDs Respective Java methods or utilities may be invoked according to the control types or actions to be taken on the Web page, to form corresponding custom locators. Based on the locators, a Selenium process or other suitable process may be invoked to execute the test actions (e.g., based on the sequence capture in the feature.xls) on a target webpage and capture the test results. These actions may be performed based on the user roles that are read from a data .xls.

Figure 2:
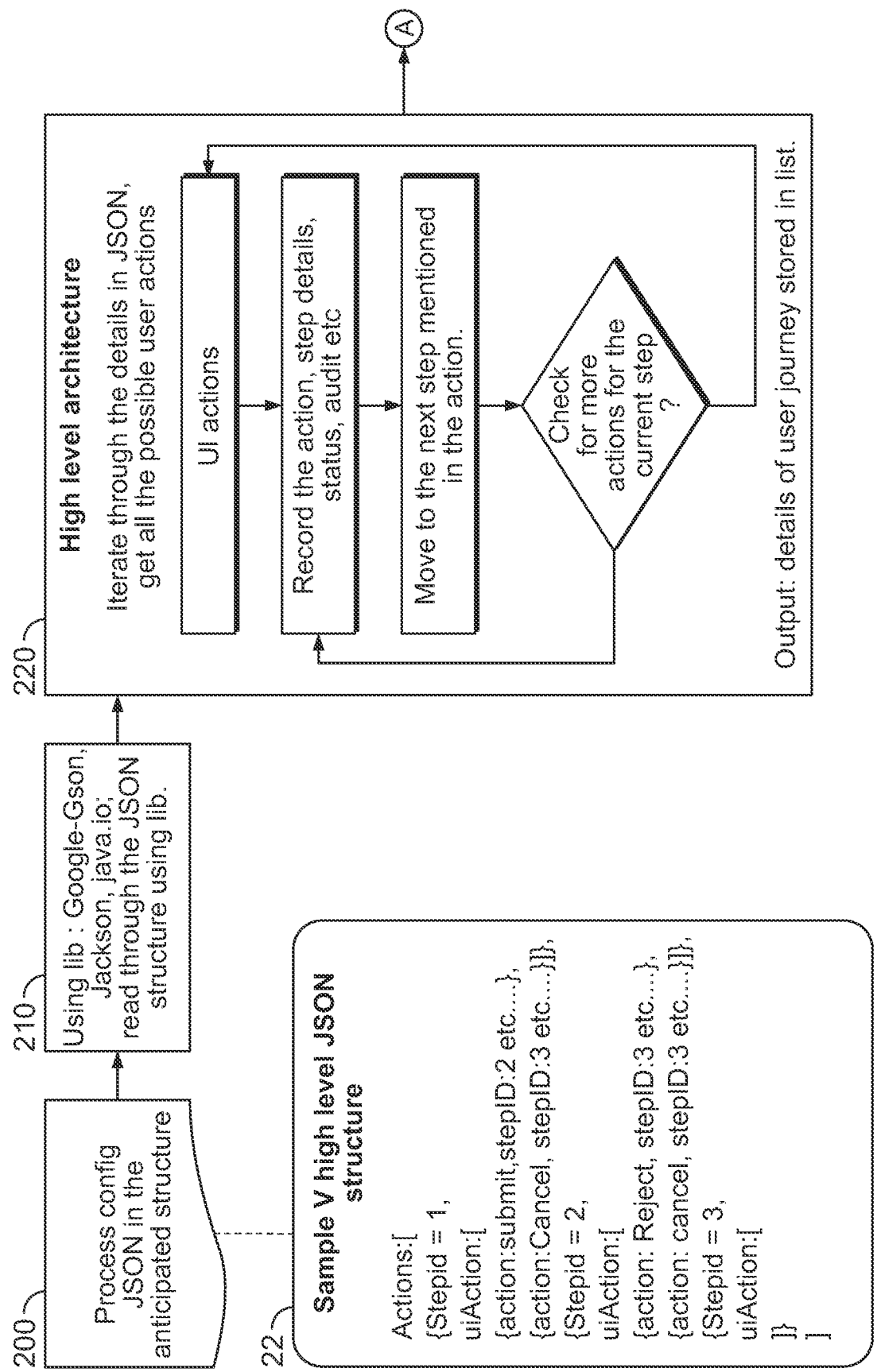
FIG. 2 is a flowchart for producing a test flow or workflow according to embodiments of the present invention.
Figure 2:
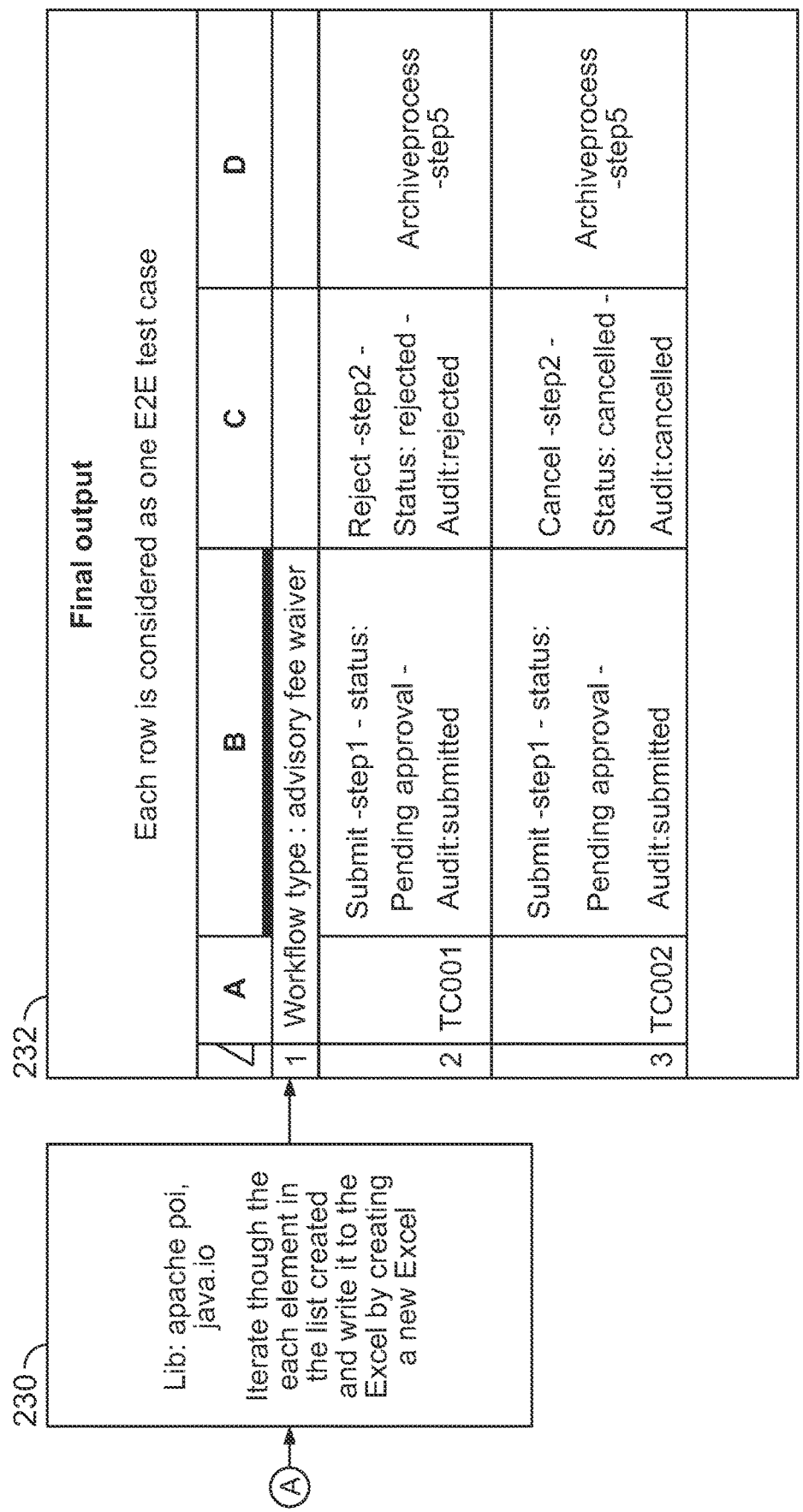

FIG. 2 is a flowchart for producing a test flow or workflow according to embodiments of the present invention. Such a process may be dynamic, e.g. in the sense it may be easily and automatically repeated if changes in a workflow occur. The process of FIG. 2 may be executed by the systems shown in FIG. 1 and FIG. 10, but may be performed by other systems.

In operation 200 input definitions of a workflow (e.g. workflow 22 in FIG. 1), may be input, e.g. in JSON form, or another suitable form. Such definitions of workflows may be configurations created by workflow designer tools. In operation 210 input definitions of a workflow may be processed or parsed. Various Java libraries may be used to interact with input files; e.g. the Jackson and Google Gson libraries may be used to read or input JSON structures defining a workflow and extract details from these inputs. In operation 220 the input data may be iterated through and all possible (e.g. not including impossible) user actions may be determined or created. The output of operation 220 may be, for example, details of user journey stored in a list. In operation 230 the output data such as a list may be used to create a different form of output data 232, e.g. in the form of .xls files such as feature files. Other forms of output data 232 may be created. Operation 230 may include iterating though each element in the list created in operation 220 and writing it to a file, e.g. an Excel file such as a process config Excel file, by creating a newly created Excel file. This may be performed using an Apache POI library, but other outputs, and other methods of creating outputs, may be used. The output file may include a workflow where each of a number of rows describes a test case flow. Each test case flow may include a series of entries such as cells or columns, each entry including a step, each step describing a sub-task within the workflow and each step corresponding to one or more UI actions. In one embodiment this mapping or correspondence is that of a token or string in a test case flow (e.g. "Step1") being the name (e.g., minus file extension) of a file describing the UI elements (e.g. "Step1.xls"). Other methods of mapping, and other operations, may be used.

FIG. 3 depicts two example test case flows, each test case flow represented as a row in a table (e.g. an Excel table), the flows being produced from an input workflow, according to embodiments of the present invention. Each test case flow may be a row including a series of entries or cells, each entry including a step describing a sub-task within the workflow, and corresponding to UI actions. A typical workflow includes more than two test case flows, and other data formats for representing test case flows may be used. In FIG. 3, workflow TC0037 includes a first step (the second column or cell in the row), which per the first token or word in the cell is an "APPROVE" step, labelled "Step2" to index to a corresponding UI step description, the step being an approval step. An "Audit" data item may indicate the expected UI or other result, and in row 1, cell 2, Audit: Approved indicates that if the UI produces "Approved" after Step2, the validation of this step returns a result of correct and if not, the result is incorrect or "failure". The "Step2" data entry in cell 2 refers the process to a separate data structure labelled Step2 which describes UI functions for this step, or a UI screen for this step (e.g. an Excel file titled Step2.xls). The third column or cell in row TC0037, Step7, represents the workflow step immediately subsequent to Step2. Referring to row or test case flow TC0038, the first entry, cell or column is a Submit step; for example a user may enter information (using UI elements in a Step1 file) to request another user to approve a request, for example to alter a customer's status. An Audit operation allows verify operations to record the status of the workflow: for example audit trails may be generated by workflow applications (e.g., IBM BPM tools, the Pega workflow and automation tool, etc.) to record the various actions taken on the active workflows; an embodiment may add validation information such as error/no error to this audit. In the example shown, in order for the test to move from Step1 to Step2 the Action of Step1 must be completed. After the user's "Submit" operation, another user may reject the submitted request, for example using UI elements described in Step2.

A series of screens or pages (displayed in a software program such as a workflow dashboard) which make up a workflow may be described in a series of step documents (e.g. individual step Excel files, containing UI details and actionable steps), e.g. Step2→Step7→Step6, which are linked in a series of cells in test case flow TC0037 in FIG. 3. In one example, a token or string ARCHIVEPROCESS, corresponding to example Step5, indicates the action as no action, as this cell describes an Archival Process archiving the workflow for future reference. An actionable step may be the end of a particular step causing the process to move to the next step; while an action may be a specific interaction with a UI element.

A definition of UI elements may be input and a dynamic process (e.g., automatic, and repeatable in the case of UI definition changes) may, from this definition, extract or produce UI element detail descriptions including UI element detail descriptions (including, e.g. UI actions and UI control types). This may be done on a per screen basis, e.g. each screen of workflow software corresponding to a step in a test case flow. This extraction may be hierarchical, e.g. as a JSON tree structure with key-value pairs. A process may identify all attributes related to a UI Element such as control types, object names, values, and options associated with each page from input (e.g. JSON input), translate them into actionable steps, and write or output them into an output file, such as an Excel file using, e.g., an Apache POI library or another tool. Depending on the different workflow steps, a process may dynamically generate an individual UI file (e.g. a UI Excel file, a screen Excel file) for each UI screen by reading the input process JSON; output may this be, e.g. Screen1.xlsx, Screen2.xlsx, etc. Other types, formats and organizations of output may be used. A smart interaction prefilling technique may identify the dynamic nature of different control types, and may dynamically adapt to different control types, ensuring accurate representation in the output (e.g. a UI Excel file). An embodiment may when analyzing UI elements consider the various actions that can be taken on the UI element and handle associations of actions to respective UI elements automatically. This adaptability may be important for applications with diverse and evolving UI components.

FIG. 4 depicts an example portion of a UI element detail description, e.g. a step or screen represented in a file or table, according to one embodiment. The example UI element detail description in FIG. 4 is represented as an Excel table, but other data structures may be used. The data depicted in FIG. 4 represents a portion of UI element data corresponding to the token and step Step2 in FIG. 3. Rows 7 and 8 depict labels, static text which do not have any control types or object names in the UI. The example data in FIG. 4 represents UI actions (e.g. some interaction of a test process with an on-screen UI element) and verifications to take place on one screen of UI elements. Column A, labelled "Keyword", includes UI actions, which may be for example "Verify" (e.g. verify that the UI is outputting certain data, or is labelled certain data); "SetText" (e.g. enter text into a UI element or control); "click" (e.g. click on a radio button or dropdown UI control type); etc. The data in cells of column "Control Type" represents the UI control types to be verified or operated on (e.g. label, section, radio, textbox, date, dropdown, text area, widget, etc.). For example, the second row indicates that the UI element having a type of Label should be verified to have a value of "View Transfer Details", and the fifth row indicates that a test process should enter text "test comments to a textarea control labelled "Submitter Comments".

Figure 5:
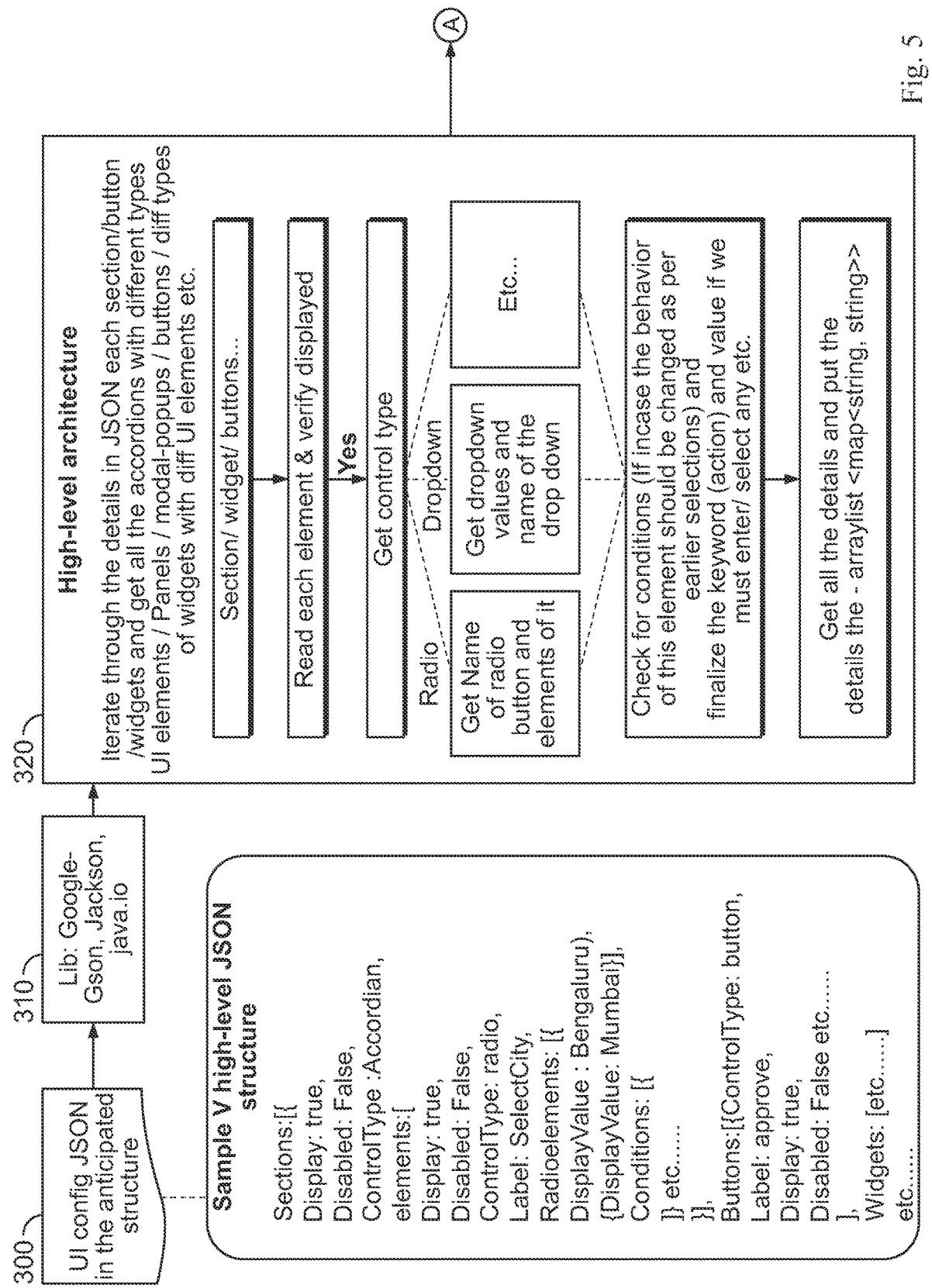
FIG. 5 is a flowchart for dynamic UI element extraction, e.g. to be performed for each workflow screen or display, according to embodiments of the present invention.
Figure 5:
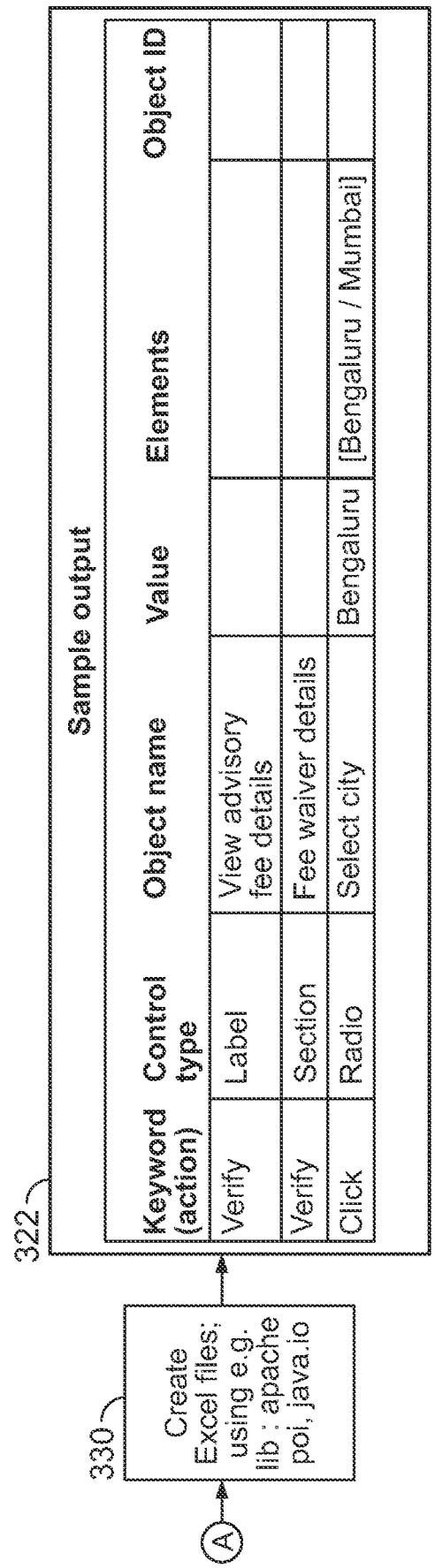

FIG. 5 is a flowchart for dynamic UI element extraction, e.g. to be performed for each workflow screen or display, according to embodiments of the present invention. The process of FIG. 5 may be executed by the systems shown in FIG. 1 and FIG. 10, but may be performed by other systems. In operation 300, definitions of UI elements for software programs and the anticipated structure (e.g. UI definition 23 in FIG. 1), may be input, e.g., a UI config JSON file, or another suitable form, which may be produced by, for example workflow designer tool such as the IBM BPM tool, and Pega workflow tools. In operation 310 input definitions of a workflow may be processed or parsed. A process may read through input structures (e.g. Json structures using Jackson and Google Gson libraries). Various tools may be used to interact with input files; e.g. the Java.io, Jackson and Google Gson libraries may be used to read, parse or input nested JSON structures defining UI inputs and extract details from these inputs. Google Gson tools may be used for parsing complex JSON structures related to UI elements. In operation 320 a process may iterate through the details in each input (e.g. Json input) and for each UI element (e.g. section, button, widgets) determine or obtain all the options for the relevant elements, e.g. menus, accordions, input options, etc. for each different types of UI elements, such as panels, modal-popups, buttons, different types of widgets and different UI elements. Output may be the details of all possible UI elements available on-screen extracted and stored in, e.g. a list.

In operation 330, the output from operation 320 may be converted to a different format, such as Excel files 322, e.g. using a library such as Apache POI, which may be used to generate a feature Excel. Such a process may iterate though each mapping on the list (e.g. <Map<String, String>>) and create an Excel file with the details of the mapping. A different Excel file may be created for each different UI page or screen. The output may include UI element detail descriptions, each UI element detail description including UI actions (e.g., describing an interaction with a UI element) and UI control types, e.g. as can be seen in example FIG. 4. A UI action may include or cause a validation or verification of a UI element, which may result in an output such as "successful" or "unsuccessful". For example a UI action may validate or verify that a button has an output "cancel". Validation may include verifying that data describing the context of the workflow, e.g. the status of a customer account, stays constant from one workflow stage or screen to another; if the data is not constant, an error in may be generated in a report. UI selections or inputs made in one step may be retained, and activation of their dependent actions may be recorded and carried over and used for analysis in subsequent steps. Validation may include ensuring the workflow path operates correctly: for example, after a "reject" action (e.g. where a supervisor rejects a request made by a user in a workflow) no further action is typically taken, so any action after a reject may result in an error. Validation may include ensuring that the entry of certain data results in a certain other set of data being displayed: for example receiving data indicating a customer has status X may require that a certain range of dates be displayed in a UI element. Other operations may be used.

The outputs from analyzing workflow input and UI input may be integrated using an intelligent mapping or blending process to form a test script. In one embodiment, the mapping of steps in test case flows to steps describing UI element detail descriptions may be used to produce a test script to control UI elements in software programs to be tested. A process may dynamically map or correlate workflows or test case flows to corresponding UI element detail descriptions (e.g. UI page files), for example using Java code. In one embodiment, each row in a process config Excel file represents a test case flow (e.g., TC001, TC0002), and each column or cell within a row represents a step that is combined with the relevant or corresponding UI element detail description or UI Excel file to form a complete E2E test case in an output such as a Feature Excel file. Data in UI and test case flow files may be correlated by, e.g. matching or correlating strings or tokens; the matched data may be extracted and placed in an output such as a test script or source for a test script. A Feature Excel file may serve as an interactive reference during a Selenium process execution, enabling direct navigation from test cases to the associated UI steps. While a Selenium process is used in some embodiments for testing, in other embodiments other processes may be used.

Figure 6:
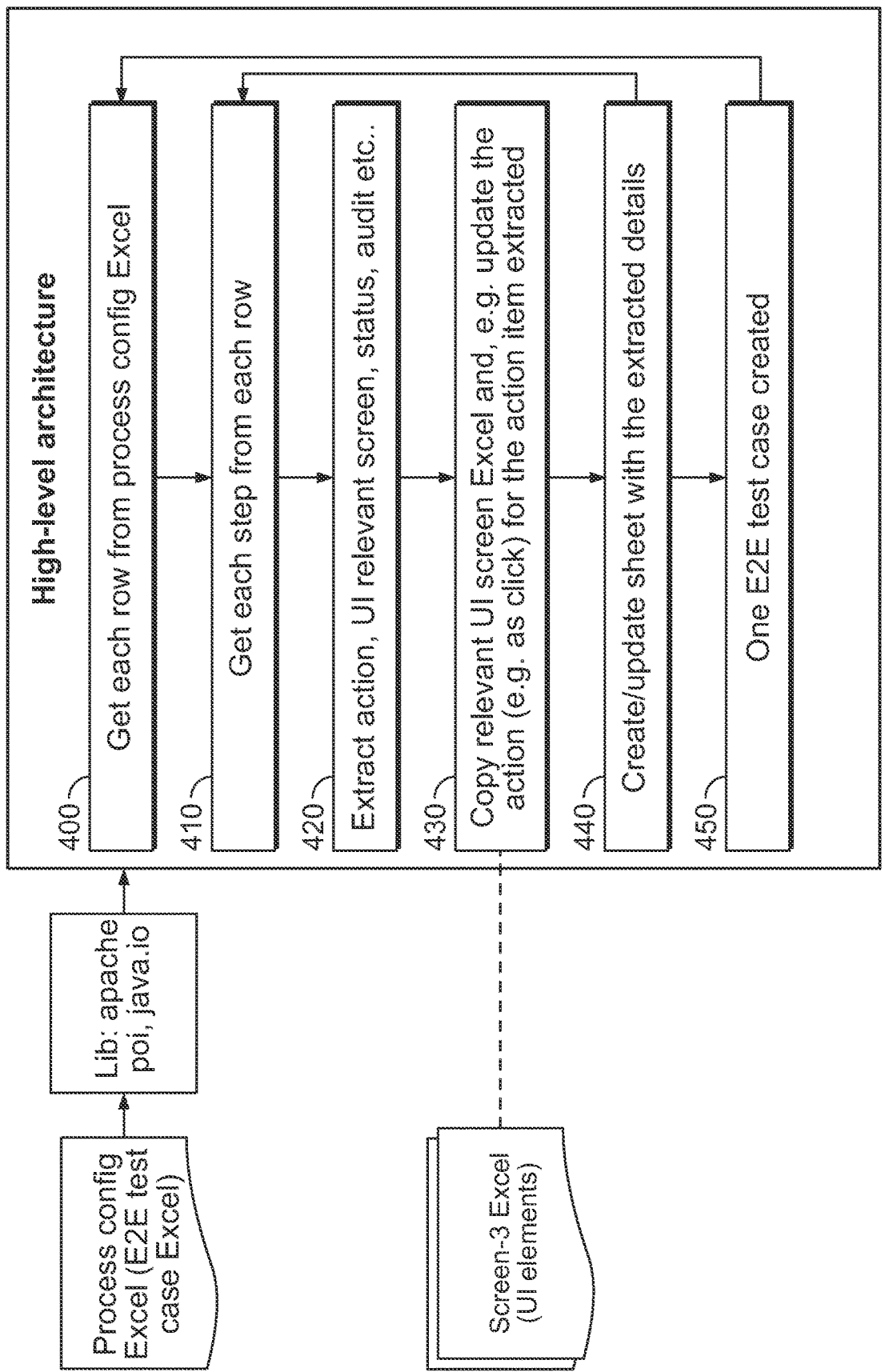
FIG. 6 is a flowchart for dynamic mapping, combining or blending of steps in test case flows to steps describing UI element detail descriptions to generate or produce a test script to test, validate and control UI elements of software programs, according to embodiments of the present invention.

FIG. 6 is a flowchart for dynamic mapping, correlating combining or blending of steps in test case flows to steps describing UI element detail descriptions to generate or produce a test script to test, validate and control UI elements of software programs, according to embodiments of the present invention. The process of FIG. 6 may be executed by the systems shown in FIG. 1 and FIG. 10, but may be performed by other systems. Input to the process of FIG. 6 may include for example the output from FIG. 2 and FIG. 5, but may include other input.

In operation 400, a row from an input table spreadsheet (e.g. an .xls spreadsheet such as a process config Excel file or other data structure) may be input, where the row describes a test case flow. The process may iterate across each row of a workflow designer tool process config Excel file which may be considered as one E2E Test case (e.g. from initiation to archiving for future reference), and down each row to the next row. In operation 410, a step, typically represented by an entry, column or cell, in the row may be input. In one embodiment the step UI element details corresponding to the entry, column or cell are stored in a separate file (e.g. as shown in example FIG. 4) and are input to be combined with the process config file. In operation 420, from the step, column or cell, data may be extracted such as a UI element detail description, UI actions, UI control types, an action, UI relevant screen, status, audit, or other information. Cell data, such as strings or tokens in cells, may be used to map or correlate steps in test case flows (e.g. in a process config Excel file) to steps describing UI element detail descriptions: in one embodiment this is a mapping of a step from a process config Excel file to an Excel file describing a UI screen, but other methods of organizing data, or mapping, may be used. In operation 430, in order to perform mapping or correlation, the relevant UI element detail descriptions, e.g. in a UI Excel file or UI screen Excel file, such as a cell in FIG. 4, may be accessed and information in that description or file copied. As part of this, an action may be updated or associated (e.g. as click) with a UI element for the action item extracted.

In operation 440, for each mapping, a test script may be produced to control one or more UI elements in software. For example, an output such as a test script, or an intermediate definition used to produce a test script, may have the extracted and copied information from operation 430 added to it. If after operation 440, more steps, columns or cells exist in the row, the process may loop or iterate to operation 410 to get the next step, column or cell; otherwise in operation 450 one test case may be considered to be completed, and the file containing the output, e.g. a, Excel file, may be completed. Each output file or Excel sheet may be considered one E2E test case which may act as a source for a test process such as a Selenium test process to perform. Each test script or test process may include or cause a series of UI actions, typically describing or causing an interaction with a UI element, such as UI verify operations (e.g. confirming that a UI element outputs a certain output) and UI input operations (e.g. click on button, input or set text, etc., to a specific UI element). In operation 450, if more rows exist in the workflow process or process config Excel file, the process may loop or iterate to step 400; otherwise the process may complete.

FIG. 7 depicts a portion of an example E2E test case which may act as a source for a test process, to create a test script, according to one embodiment. A source for a test process and a test script itself may include a series (e.g. depicted as a series of rows in this example) of UI actions, the UI actions including, for example, UI verify operations and UI input operations. Each UI action, in a source for a test, and in a test script, may describe an interaction with a UI element, e.g. an input to or validation of, a UI element. Actions in FIG. 7 may be stored in table (e.g. having rows and columns) form, such as in an Excel table, but other data structures may be used. For example, a row with "click" in the first column may indicate the test process clicks on the control type in the second column (e.g. radio UI element), to select certain data (e.g. "Category1") from among a set of displayed choices (e.g. "Category1/Category2/Category3"). The data depicted in FIG. 7 may be a result of a dynamic mapping operation. In FIG. 7, the second and third row indicate that the actions following are work the Transfers workflow and a Submit action (e.g., a UI input operation) within this workflow; the fourth row indicates that a control type label should have its data checked or verified (e.g., a UI verify operation), and if the data or display matches "View Transfers Details" this UI element is deemed to have performed properly. The row with "Click" in the first column or cell indicates a process should click the radio button labelled "Category". The data in FIG. 7 may be a result of a combination data from a StepX file tied to an expansion of data in a cell of FIG. 3.

Figure 8:
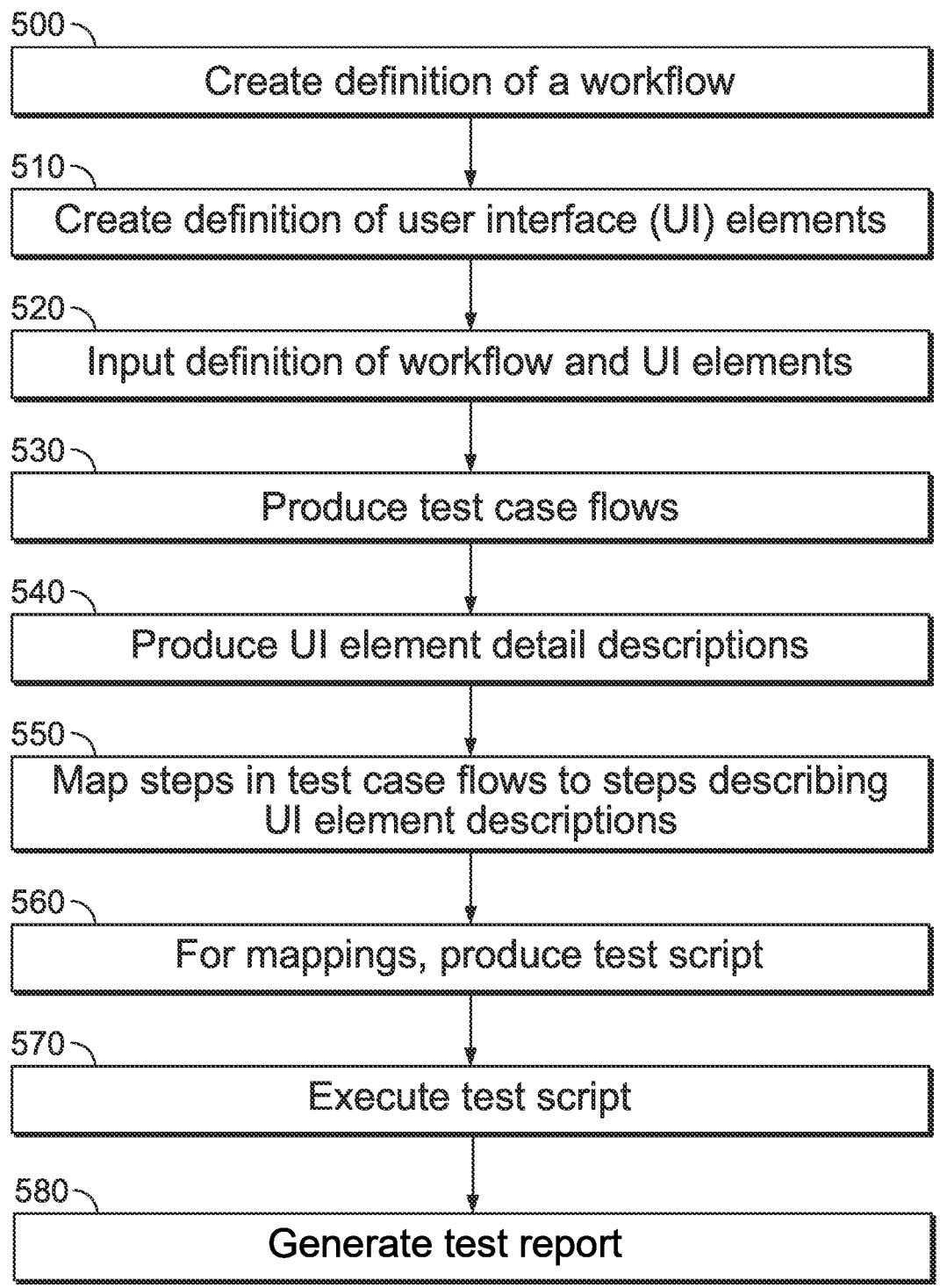
FIG. 8 shows a flowchart of a method for generating a test for software according to embodiments of the present invention.

FIG. 8 shows a flowchart of a method for generating a test for software according to embodiments of the present invention. The operations of FIG. 8 may be performed by computer systems shown in FIGS. 8, but other computer systems may be used. While exemplary methods are depicted for illustrative purposes in the flowcharts herein, it will be appreciated by those skilled in the art that features and operations from these procedures may be selectively combined with features and operations from alternative embodiments of the invention without departing from the remit of the disclosure. Further, while certain features and operations are expressly included in the flowcharts herein, it will be appreciated by those skilled in the art that not all depicted features and operations are mandatory elements, and that different embodiments may omit certain features or operations without departing from the remit of the disclosure. Accordingly, embodiments including combinations of the features and operations recited in the flowcharts described herein are expressly within the remit of the disclosure and do not constitute an intermediate generalization of the same.

In operation 500, a definition of a workflow may be created or defined for one or more software programs. The workflow may describe or relate to one or more software programs. In operation 510, a definition of user interface (UI) elements for the software programs may be defined or created. Definitions as in operations 500 and 510 may be created by, for example, workflow designer tool 28.

In operation 520, the definition of the workflow and the definition of UI elements may be input. In operation 530, test case flows may be produced from the definition of the workflow. Test case flows may be written in the Java programming language; the Apache library may be used to develop this output. In operation 540, UI element detail descriptions may be produced from the definition of UI elements. A UI element detail description may include information such as UI actions and UI control types, and other information. In operation 550, a process may associate or map steps in test case flows to steps describing UI element detail descriptions. In operation 560, for each mapping, a test script or process may be produced (or one overall script may be produced for all mappings), which may be used to control software, for example by controlling UI elements in the software programs, and to audit or verify that the workflow in the software functions properly.

In operation 570, the test script(s) may be executed. For example, a test script may control or be used by a Selenium process to execute the workflow, simulating a user interacting with software such as a workflow dashboard (e.g. making UI input operations to user devices 14; receiving input from a UI 16, which may include providing input to and receiving output from a browser which executes or provides a user interface for a workflow dashboard), to test and validate the workflow which the software carries out during normal use. The workflow may relate to data processing in one or more software systems.

For validation in operation 570, data in a test script which may be considered expected output (e.g. which may be produced from the example data in FIG. 7) may be compared to output from the testing of the workflow, and expected output that does not correlate or equate to expected UI or other output valuesmay be flagged as errors, or labelled correct, incorrect/failure, etc. For example, a workflow may indicate that a UI element (e.g. a button) may have an expected label, and if the testing of the workflow portion describing this UI element does not produce this label, an incorrect validation result may be output for this UI element; otherwise it may be correct. An expected status of a step may be, e.g. pending (e.g. pending approval of another user), approve (e.g. a user providing input to the workflow approves of user input), cancel (e.g. a user cancels a workflow step), reject (a user providing input to the workflow rejects user input, e.g. in the case the test process inputs date input outside a range), completed, archived, or "no action", and if the actual workflow status output does not match the expected output of a validation step, this step may be labelled incorrect as part of validation, or in a report. For example, a cell entry in a Keyword column in FIG. 7 may include "Status: Rejected—Audit:Rejected" (which may be taken or mapped from a Step file or spreadsheet): if the result of the step is Accepted, this is validated as failure/incorrect. In operation 580, a report including verification, conformance, or errors, may be generated. FIG. 9 depicts an example report, according to one embodiment.

Other operations or series of operations may be used.

Figure 10:
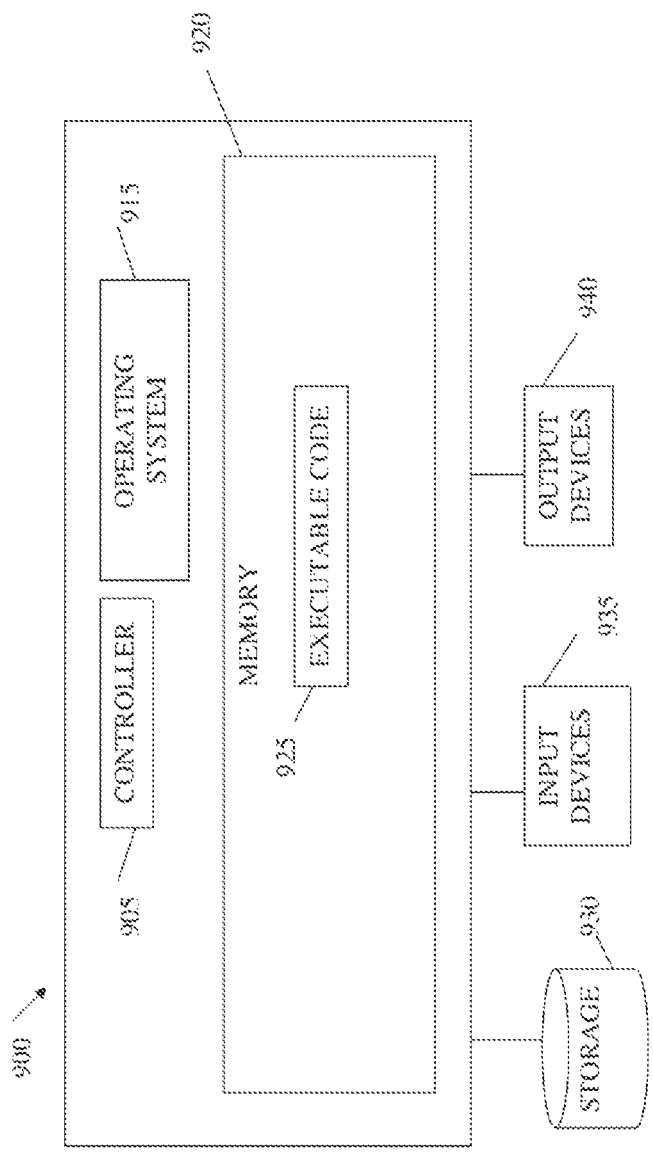
FIG. 10 shows a high-level block diagram of an exemplary computing device according to some embodiments of the present invention.

Reference is made to FIG. 10, showing a high-level block diagram of an exemplary computing device according to some embodiments of the present invention. Computing device 900 may include a controller 905 that may be, for example, a central processing unit (CPU) or any other suitable multi-purpose or specific processor(s) or controller(s), a chip or any suitable computing device, an operating system 915, a memory 920, executable code 925, a storage system 930, input devices 935 and output devices 940. Controller 305 (or one or more controllers or processors, possibly across multiple units or devices) may be configured to carry out methods described herein, and/or to execute or act as the various modules, units, etc., for example when executing code 925. More than one computing device 900 may be included in, and one or more computing devices 900 may be, or act as the components of, a system according to embodiments of the invention. Various components, computers, and modules of FIG. 1 may be or include devices such as computing device 900, and one or more devices such as computing device 900 may carry out functions described herein. Components in FIG. 1, such as user devices 14, developer computer 20, computer system 10, workflow designer tool 28, software package 12, and test process 26, and other modules and processes such as a Selenium process, may be or may be executed by a computer system such as in FIG. 10.

Operating system 915 may be or may include any code segment configured to perform tasks involving coordination, scheduling, controlling or otherwise managing operation of computing device 900.

Memory 920 may be or may include, for example, a Random Access Memory (RAM), a read only memory (ROM), a volatile memory, a non-volatile memory, a cache memory, or other suitable memory or storage units. Memory 920 may be or may include a plurality of, possibly different memory units. Memory 920 may be a computer or processor non-transitory readable medium, or a computer non-transitory storage medium, e.g., a RAM.

Executable code 925 may be any suitable code, e.g., an application, a program, a process, task or script. Executable code 925 may be executed by controller 905 possibly under control of operating system 915. For example, executable code 925 may configure controller 905 to perform methods as discussed herein. A system according to some embodiments of the invention may include multiple code segments 925 loaded into memory 920 to cause controller 905, when executing code 925, to carry out methods described herein.

Storage system 930 may be or may include, for example, a hard disk drive, a CD-Recordable (CD-R) drive, a universal serial bus (USB) device or other suitable removable and/or fixed storage unit. Data may be stored in storage system 930 and may be loaded from storage system 930 into memory 920.

One or more input device(s) 935 may be or include a mouse, a keyboard, a microphone, a touch screen or pad or any suitable input device. One or more output device(s) 940 may include displays or monitors, speakers and/or any other suitable output devices. For example, a wired or wireless network interface card (NIC), a printer, a universal serial bus (USB) device or external hard drive may be included in input devices 935 and/or output devices 940.

Device 900 may include or may be, for example, a personal computer, a desktop computer, a laptop computer, a workstation, a server computer, a network device, or any other suitable computing device.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for generating a test for a workflow operated by software, the method comprising, by a computer processor:
   inputting a first file, the first file comprising a definition of a workflow relating to data processing in a software program, the definition of the workflow defining rules related to: a routing of the workflow to a target state, and actions involved in the routing, and inputting a second file, the second file comprising a definition of user interface (UI) elements for the workflow, the UI elements controlling data input to and output from the software program, wherein the first file is different from the second file;
   producing from the definition of the workflow a plurality of test case flows, each test case flow comprising a path among a plurality of possible paths in the workflow;
   producing from the definition of UI elements a plurality of UI element detail descriptions, each UI element detail description comprising UI actions and UI control types;
   mapping steps comprised in test case flows to steps describing UI element detail descriptions; and
   for each mapping producing a test script to operate the workflow.

2. The method of claim 1, wherein the workflow represents interactions of users and UT elements comprised in the software program.

3. The method of claim 1, wherein each test case flow comprises a series of entries, each entry comprising a step, each step describing a sub-task within the workflow and each step corresponding to one or more UI actions.

4. The method of claim 1, wherein each test script comprises a series of UI actions, the UI actions comprising UI verify operations and UI input operations.

5. The method of claim 1, wherein each UI action describes an interaction with a UI element.

6. The method of claim 1, wherein a UI action comprises a validation of a UI element.

7. The method of claim 1, comprising executing the test script.

8. A system for generating a test for a workflow operated by software, the system comprising:
   a memory; and
   a computer processor configured to:
      input a first file, the first file comprising a definition of a workflow relating to data processing in a software program, the definition of the workflow defining rules related to: a routing of the workflow to a target state, and actions involved in the routing, and input a second file, the second file comprising a definition of user interface (UI) elements for the workflow, the UI elements controlling data input to and output from the software program, wherein the first file is different from the second file;
      produce from the definition of the workflow a plurality of test case flows each test case flow comprising a path among a plurality of possible paths in the workflow;
      produce from the definition of UI elements a plurality of UI element detail descriptions, each UI element detail description comprising UI actions and UI control types;
      map steps comprised in test case flows to steps describing UI element detail descriptions; and
      for each mapping produce a test script to operate the workflow.

9. The system of claim 8, wherein the workflow represents interactions of users and UI elements comprised in the software program.

10. The system of claim 8, wherein each test case flow comprises a series of entries, each entry comprising a step, each step describing a sub-task within the workflow and each step corresponding to one or more UI actions.

11. The system of claim 8, wherein each test script comprises a series of UI actions, the UI actions comprising UI verify operations and UI input operations.

12. The system of claim 8, wherein each UI action describes an interaction with a UI element.

13. The system of claim 8, wherein a UI action comprises a validation of a UI element.

14. The system of claim 8, comprising executing the test script.

15. A method for creating a workflow test, the method comprising, by a computer processor:
inputting a first file, the first file comprising a workflow describing operations causing data processing in a software program, the definition of the workflow defining rules related to: a routing of the workflow to a target state and actions involved in the routing, and inputting a second file, the second file comprising a definition of user interface (UI) elements for the workflow, the UI elements used for inputting data to and output from the software program, wherein the first file is different from the second file;
producing from the definition of the workflow test case flows each test case flow comprising a path among a plurality of possible paths in the workflow;
producing from the definition of UI elements a UI element detail descriptions, each UI element detail description comprising UI actions;
correlating steps comprised in test case flows to steps describing UI element detail descriptions; and
using the correlation to produce a test script to operate the workflow.

16. The method of claim 15, wherein the workflow represents interactions of users and UI elements comprised in the software program.

17. The method of claim 15, wherein each test case flow comprises a series of entries, each entry comprising a step, each step describing a sub-task within the workflow and each step corresponding to one or more UI actions.

18. The method of claim 15, wherein each test script comprises a series of UI actions, the UI actions comprising UI verify operations and UI input operations.

19. The method of claim 15, wherein each UI action describes an interaction with a UI element.

20. The method of claim 15, comprising executing the test script.

* * * * *